Figure 3:
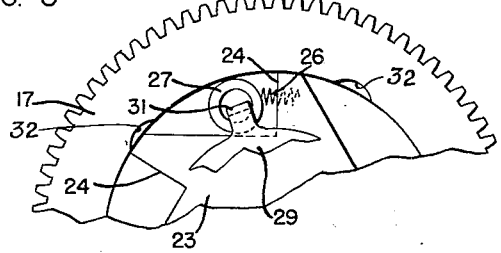

Dec. 30, 1941.  E. S. LARSON  2,268,455

POWER TRANSMITTING MECHANISM

Original Filed May 18, 1938

INVENTOR.
EDWARD S. LARSON
BY
ATTORNEY.

Patented Dec. 30, 1941

2,268,455

UNITED STATES PATENT OFFICE 2,268,455

POWER TRANSMITTING MECHANISM

Edward S. Larson, Chicago, Ill., assignor to Teletype Corporation, Chicago, Ill., a corporation of Delaware Original application May 18, 1938, Serial No. 208,761. Divided and this application December 30, 1939, Serial No. 311,712

2 Claims. (Cl. 192—45)

This invention relates to power transmitting mechanisms and particularly to roller bearing clutch mechanisms.

This application is a division of copending application, Serial No. 208,761, filed May 19, 1938, by E. S. Larson.

An object of the invention resides in an improved and simplified method of assembling a roller bearing grip clutch.

The invention features the use of a spider for simplifying the assembly of a roller bearing clutch mechanism, the fingers of the spider receiving the rollers and enabling the compression of springs for the individual rollers by a single operation, whereby the roller assembly may be worked into a ring member as a unit without necessitating manipulation of the rollers individually. The spider becomes a permanent part of the assembly and serves as a retainer for the rollers.

The hereinbefore identified copending application, and also a copending application, Serial No. 193,642, filed March 3, 1938, by Albert H. Reiber, discloses printing telegraph apparatus with the reference to which the present invention is possessed of particular utility. Included in the printing telegraph apparatus according to the copending applications is a main operating cam assembly which is driven by a continuously rotatable shaft through a spring loaded jaw clutch capable of driving in one direction only. The cam assembly has secured thereto the inner element of a roller bearing grip clutch, the outer element of which is a ring gear which is secured to the driving gear for the main operating shaft. Roller bearing members are urged by compression springs into gripping engagement with the inner and outer members of the roller bearing grip clutch, the purpose of the assembly being to limit the speed of rotation of the main operating cam assembly to that of its driving shaft should it tend to accelerate under conditions of negative load. The roller bearing grip clutch is arranged in compact relation to the main cam assembly, which necessitates placement of the roller bearings substantially in proper position with respect to the inner member with the compression springs interposed between the inner member and the rollers, whereupon the inner member and rollers are worked into position in the outer member as a unit.

In order to simplify the assembly of the roller bearing clutch mechanism and obviate the individual handling of the rollers during insertion into the outer member, a method of assembly has been developed which involves the use of a spider having fingers for receiving the rollers. The spider is supported by the cam assembly above the inner roller bearing clutch member and is freely rotatable upon the cam assembly but it not movable axially thereof. After the compression springs have been placed in sockets in the inner clutch member and the rollers have been placed upon the fingers of the spider, the spider may be rotated relative to the inner clutch member in the direction to compress the springs, whereby the rollers are worked in close to the surface of the inner clutch member and are prevented from being thrust outwardly by the compression springs. The compression springs exert a frictional retaining force upon the rollers and prevent them from falling from the depending fingers. The assembled inner clutch member, spider, and rollers may then be inserted into the outer member of the roller bearing clutch and the spider serves as a permanent retainer for the rollers.

Figure 1:
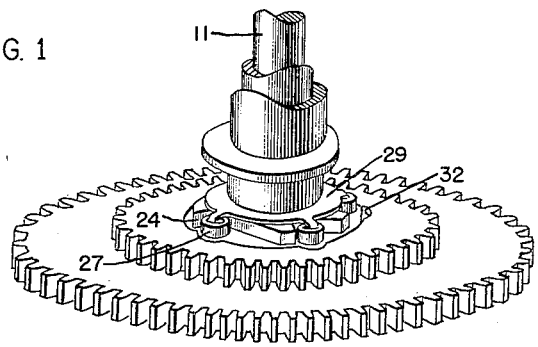
Figure 2:
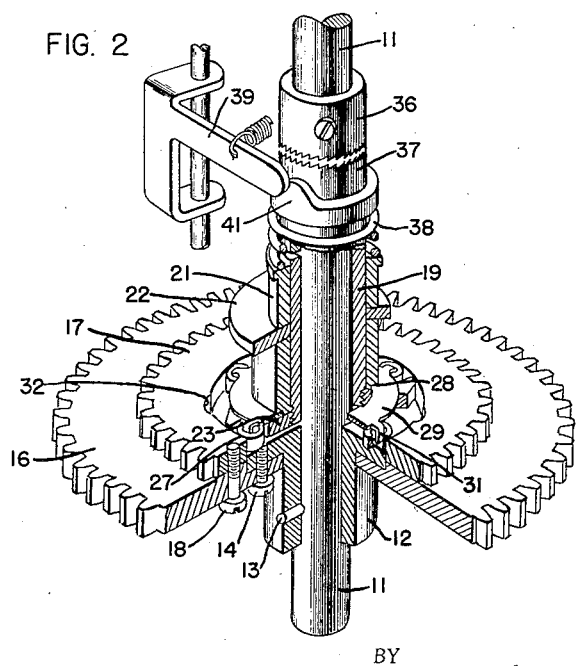

For a complete understanding of the invention, reference may be had to the following detailed description to be interpreted in the light of the accompanying drawing, wherein Fig. 1 is a perspective view to illustrate the method of assembling the roller bearing grip clutch, showing the subassembly of inner clutch members, retaining spider, and rollers about to be inserted into the outer clutch member;

Fig. 2 is a perspective view partly in section showing the completely assembled roller bearing grip clutch; and Fig. 3 is a detail view of the roller bearing clutch mechanism.

Referring now to the drawing, the reference numeral 11 designates a shaft to which hub 12 is pinned by pin 13. Hub 12 has secured thereto by means of screws 14 a gear 16 which may mesh with a continuously driven gear (not shown) whereby continuous rotation may be imparted through hub 12 to shaft 11. A gear 17 for imparting rotation to another shaft, as fully disclosed in the hereinbefore identified copending application, is secured to gear 16 by means of screws 18.

A sleeve 19 has secured thereto a cam assembly sleeve 21 whch may have secured thereto one or more function performing cams 22. Rotation may be imparted to sleeve 19 from shaft 11 through a unidirectionally operable positive clutch mechanism to be described later.

The sleeve 19, to which the cam assembly sleeve 21 is secured, is threaded at its lower end and the inner member 23 of a roller bearing grip clutch is threadedly secured to the lower end of sleeve 21. Inner clutch member 23 fits into the central aperture of gear 17 and is retained in close proximity to the hub 12 of gear 16 as shown in Fig. 2. Inner clutch member 23 has a plurality of substantially right angled notches cut in the periphery thereof, the faces defining these notches being of unequal length, the shorter of the two faces of each notch, designated by the reference numeral 24, extending substantially radially of the member 23. The angularly disposed faces of the notches and the adjacent arcuate inner surface of ring gear 17 define recesses that are generally triangular, being bounded by two plane surfaces and a curved surface. Each of the short faces 24 of the notches in member 23 is recessed to receive and support one end of a compression spring 26. An axially drilled roller bearing 27 is disposed in each of the generally triangular recesses, and the compression spring 26 tends to wedge the roller bearing between the long face of the notch and the arcuate internal surface of ring gear 17.

The lower end of cam sleeve 21 is undercut to provide a shoulder 28 against which a retainer ring 29 is placed before member 23 is secured to sleeve 19. Retainer ring 29 fits loosely on the undercut portion of sleeve 21 and is not clamped in place but is free to rotate. Ring 29 serves as a partial cover for rollers 27 and prevents them from escaping from their respective recesses in the event that a printing telegraph mechanism, or other apparatus in which the assembly is contained, is inverted, such as, for example, during packing or shipping. Ring 29 has an even more important function which will now be described.

Since roller bearings 27 cannot be inserted into their recesses after member 23 has been placed in position in ring gear 17, the retainer ring 29 preventing this, it is necessary to fit member 23 and rollers 27 into position in ring gear 17 at the same time. Spring 26 tend to complicate the bringing of the member 23 and the rollers 27 into final position together, by thrusting the rollers 27 out of the position in which they must be held in order to be inserted with member 23 into ring gear 17. The insertion of rollers 27 and member 23 has been simplified by providing ring 29 with depending fingers 31 so that ring 29 may be employed as an implement for locating rollers 27 well into their notches in member 23, and for holding them in such positions in opposition to their springs 26 while the subassembly is being inserted into ring gear 17. The rollers 27 are provided with axial bores of sufficient size that the rollers may fit loosely on depending fingers 31 of ring 29.

When it is desired to fit the subassembly comprising clutch sleeve 21, its supporting sleeve 19, inner clutch member 23, and retaining ring 29 into final position with inner clutch member 23 seated inside ring gear 17, a roller 27 is placed upon each of the fingers 31 of ring 29. As each of the rollers 27 is placed upon its finger 31, its compression spring 26 moves it away from the surface which contains the spring socket. The roller in being thus moved may impart counterclockwise rotation to ring 29 until finger 31 has moved as near to the long surface of the notch in member 23 as the thickness of the wall of roller 27 will permit. Thereafter, spring 26 will frictionally engage the exterior of roller 27 and will cause it to be gripped between finger 31 and the long face of the notch in member 23, so that the roller will not drop from finger 31 while the other rollers are being placed on their respective fingers, nor while the subassembly is being fitted into ring gear 17. After all of the rollers 27 have been placed upon the fingers 31, ring 29 may be rotated in a clockwise direction to compress springs 26 to a considerable extent, thus bringing the rollers 27 as close as possible to the radial faces 24 of the notches in inner clutch member 23 at which point the recess which will be formed when member 23 is lowered into bring gear 17 will be of greatest width. Rollers 27 do not need to be held nor manipulated individually, as ring 29 imparts to all of them the desired movement toward radial faces 24 of the notches. With rollers 27 held well within the confines of the notches in member 23 by ring 29, the subassembly may be lowered into ring gear 17 after which the hold upon ring 29 may be released, thus permitting springs 26 to move rollers 27 into frictional engagement with the long faces of the notches and with the internal surface of ring gear 17, ring 29 rotating freely to permit this movement of rollers 27.

The positioning of rollers 27 so that they will enter ring gear 17 readily will be simplified if rollers 27 are caused to seek continuous engagement with the long faces of the notches in member 23. This may be accomplished as shown in Fig. 3, by disposing the sockets or recesses for springs 26 so that the axes of the springs shall be outside the plane in which the axes of the rollers 27 move as the rollers move in contact with the long faces of the notches. It may also be desirable to proportion retainer ring 29 so that its fingers 31 are always inside the axes of springs 26. The fingers may thus form fulcrums about which springs 26 may rock rollers 27 into engagement with the long faces of the notches, but whether or not the fingers form fulcrums for the rollers, the forces exerted by the springs 26 upon the rollers 27 have components which tend to keep the rollers in engagement with the long faces of the notches in member 23. The rollers 27 are thus forced inwardly sufficiently so that there will be no interference when the roller subassembly is fitted into ring gear 17.

Further simplification of the insertion of the subassembly comprising inner clutch member 23, rollers 27, and ring 29 into ring gear 17 may be afforded by providing clearance recesses 32 in the ring gear 17. Recesses 32 are cut partially into the inner surface of ring gear 17 and partially into the upper face thereof, thus providing inwardly sloping cam surfaces. Should there be any tendency of springs 26 to thrust rollers 27 outwardly during insertion of the subassembly into ring gear 17, the sloping cam surfaces will guide the rollers 27 down into the interior of ring gear 17, it being understood that the spacing of clearances 32 corresponds with the spacing of rollers 27 and that the subassembly may be placed in such angular position with respect to ring gear 17 that rollers 27 are aligned with the clearances 32 before an attempt is made to insert the subassembly into the ring gear 17.

An understanding of the exact nature of the clutch by which cam sleeve 22 is driven is prerequisite to an understanding of the utility of the roller bearing grip clutch consisting of member 23, rollers 27, and ring gear 17, the roller bearing clutch being used in the present invention as a brake. Shaft 11 has secured thereto a driving element 36 of a positive drive single revolution clutch mechanism. The driven element 37, which is splined or keyed to sleeve 19, to which cam assembly sleeve 22 is secured, is slidably supported upon shaft 11, is urged into engagement with driving element 36 by compression spring 38, and is normally withheld from engagement with driving element 36 by clutch throwout lever 39 which cooperates with clutch throwout flange 41 on driven clutch element 37. Each tooth of both of the clutch elements 36 and 37 has one surface substantially in a plane passing through the axis of the shaft and the other surface oblique thereto. Should any torque be applied to the driven element 37 of the clutch which exceeds the torque applied by the driving element 36, the sloping surfaces of the teeth of one clutch element may tend to slide upon the sloping surfaces of the teeth of the other clutch element, thus shifting driven element 37 axially away from driving element 36 and compressing spring 38. If the differential between the two torques is appreciable the driven element may be rotated ahead of the driving element a distance equal to the extent of several teeth of the clutch member. A torque of sufficient magnitude to cause driven clutch element 37 to rotate more rapidly than driving element 36, and thus to gain upon it, may be generated by a heavily biased cam follower riding down a sharply descending slope of its cam, such as the cam 22, and thus becoming a negative load upon the driven clutch element 37.

The roller bearing grip clutch hereinbefore described serves as a brake to prevent acceleration of cam assembly sleeve 21 under the influence of negative load upon any of its cams. Whenever cam sleeve 21 is stationary and the gears 16 and 17 are rotating, inner roller bearing clutch member 23, which is secured to sleeve 19 and, therefore, directly to cam assembly sleeve 21, is also stationary and the frictional engagement between the inner surface of ring gear 17 and rollers 27 tends to move the rollers into the widest portion of the recesses in which they are seated, the rollers thus being moved substantially free of inner clutch member 23 so that there is no tendency of gear 17 to impart rotation to the inner clutch member 23. When cam assembly sleeve 21 is released for rotation due to the tripping of the clutch by operation of clutch throwout lever 39 and is rotating at the same speed as gear 17, there is no relative movement between roller bearing clutch member 23 and ring gear 17 and the springs 26 tend to wedge rollers 27 between the long faces of the notches in inner clutch member 23, and the inner surface of gear 17. If cam sleeve 21 should be subjected to a torque which tends to rotate it faster than gears 16 and 17, the frictional engagement of rollers 27 with member 23 tends to increase the wedging of the rollers between member 23 and gear 17 so that a positive lock between inner roller bearing clutch member 23 and gear 17 is established and the cam sleeve 21 is prevented from accelerating in response to the locally applied torque and it is held to the speed of rotation of gears 16 and 17 driven by shaft 11.

Although specific embodiments of the features of invention have been disclosed and described herein, it will be understood that the invention is not limited to such specific embodiments but is capable of modification, reorganization, rearrangement and substitution of parts and elements without departing from the spirit of the invention and within the scope of the appended claims.

What is claimed is:

1. In a roller bearing clutch mechanism including a notched inner element, a cylindrically apertured outer clutch element having cut away clearances spaced in accordance with the notching of said inner clutch element, and spring pressed axially bored rollers disposed between said inner and outer clutch elements, means for facilitating the assembly of said clutch mechanism including a ring freely rotatable coaxially with and loosely supported upon said inner clutch member, and a plurality of depending fingers integral with said ring and spaced therearound according to the spacing of said cut-away clearances of said outer clutch member for receiving and supporting said axially bored rollers and for moving them collectively in opposition to their respective springs into registry with said cut-away clearances, the surfaces of said clearances constituting cam faces for camming the rollers radially inwardly in assembling the inner and outer clutch members.

2. In a roller bearing clutch mechanism, an inner clutch member having a plurality of notches in the edge thereof, an outer clutch member having an axial aperture proportioned to receive said notched member, a spring pressed axially bored roller disposed in each of the notches for engagement with both of said elements, a retainer ring resting loosely on said notched member and extending partially over said rollers, said ring having depending fingers loosely entering the axial bores in said rollers, and a plurality of clearance notches formed on the inner surfaces of the outer clutch member constituting cam faces for camming the rollers radially inwardly in assembling the inner and outer clutch members.

EDWARD S. LARSON.